United States Patent
Latham

(10) Patent No.: US 7,588,401 B2
(45) Date of Patent: Sep. 15, 2009

(54) ATV ANCHORING ASSEMBLY

(76) Inventor: Gregory Latham, 5234 Bell Williams Rd., Currie, NC (US) 28435

( * ) Notice: Subject to any disclaimer, the term of this patent is extended or adjusted under 35 U.S.C. 154(b) by 569 days.

(21) Appl. No.: 11/523,987

(22) Filed: Sep. 20, 2006

(65) Prior Publication Data

US 2007/0127999 A1 Jun. 7, 2007

Related U.S. Application Data

(60) Provisional application No. 60/742,789, filed on Dec. 6, 2005.

(51) Int. Cl.
*B60P 7/08* (2006.01)
(52) U.S. Cl. .............................. 410/7; 410/4
(58) Field of Classification Search .............. 410/3, 410/4, 7, 9, 19, 22, 80; 224/403, 533, 547, 224/567, 552, 42.38; 248/500, 503, 507
See application file for complete search history.

(56) References Cited

U.S. PATENT DOCUMENTS

| | | | |
|---|---|---|---|
| 4,580,935 A | 4/1986 | Treihaft | |
| 4,671,713 A | 6/1987 | Lenkman | |
| 5,749,685 A | 5/1998 | Hain | |
| 5,816,757 A | 10/1998 | Huston | |
| 5,833,412 A | * 11/1998 | Valencia et al. | 410/2 |
| 6,036,417 A | 3/2000 | Weaver | |
| 6,050,737 A | 4/2000 | Russell | |
| 6,077,004 A | 6/2000 | Denman, Jr. | |
| 6,099,219 A | 8/2000 | Bartholomay | |
| 6,139,235 A | 10/2000 | Vander Koy et al. | |
| 6,382,891 B1 | 5/2002 | Bellis, Jr. | |
| 6,450,472 B1 | 9/2002 | Cook, Jr. | |

* cited by examiner

*Primary Examiner*—Stephen Gordon
(74) *Attorney, Agent, or Firm*—MacCord Mason PLLC

(57) ABSTRACT

An anchoring assembly is described for use in releasably securing a transportable vehicle to the bed of a transport vehicle that includes mounting holes spaced transverse to the length of the bed at a given distance from each other. The assembly includes first and second eyebolts, each eyebolt having a circular eye and threaded shank sized for insertion downwardly through one of the mounting holes and a nut threadable on the shank beneath the bed; a cylindrical crossbar having a length greater than the given distance insertable through the eyes of the eyebolts, the crossbar including a releasable latching pin adjacent at least one of its ends; and a telescoping tie down arm having a proximal end with an eye slidable over the crossbar between the eyebolts and a distal end including a hitch connector releasably attachable to the transportable vehicle hitch.

20 Claims, 4 Drawing Sheets

ATV ANCHORING ASSEMBLY

This application claims the benefit of the filing date of provisional U.S. Patent application No. 60/742,789, filed Dec. 6, 2005, which is hereby incorporated by reference in its entirety.

BACKGROUND OF THE INVENTION (1) Field of the Invention

The present invention relates generally to an assembly for releasably securing an all-terrain vehicle or other transportable vehicle to the bed of a truck, trailer or other transport vehicle, and in particular to an assembly that holds the all-terrain vehicle securely during use, but which can be readily disassembled when not in use so that no protrusions extend upwardly from the transport vehicle bed.

(2) Description of the Prior Art

An all-terrain vehicle (ATV) is designed for off-road use, either for recreational or work purposes, and is unsuitable for driving on public roadways. Thus, it is necessary to load the ATV onto a pickup truck, trailer or other transport vehicle in order to transport the ATV between sites where it is stored and used. Since the ATV is of relatively light weight and "bouncy" due to its inflated tires, some type of anchoring assembly is required to secure the ATV to the transport vehicle bed.

While the following description will be with specific reference to all-terrain vehicles, it will be apparent that the invention is equally applicable to other types of transportable vehicles, i.e., vehicles that can be mounted on and secured to the bed of a transport vehicle, such as a pickup truck or trailer. Such transportable vehicles include but are not limited to riding lawn mowers, golf carts, 6×6s, etc. The term ATV is used for purposes of brevity and should be read to encompass transportable vehicles in addition to ATVs.

Many users attempt to secure the ATV to the transport vehicle bed with chains, bungee cords, tie down straps or ropes. However, these materials do not provide the security required to transport an ATV at highway speeds or over rough terrain and tend to work loose during use. Various other assemblies for this purpose have been proposed in the prior art. The following patents are illustrative of prior art assemblies:

U.S. Pat. No. 6,050,737 Russell
U.S. Pat. No. 4,671,713 Lenkman
U.S. Pat. No. 6,139,235 Vander Koy et al
U.S. Pat. No. 4,580,935 Treihaft
U.S. Pat. No. 6,382,891 Bellis, Jr.
U.S. Pat. No. 5,749,685 Hain
U.S. Pat. No. 6,036,417 Weaver
U.S. Pat. No. 6,077,004 Demnan, Jr.
U.S. Pat. No. 5,816,757 Huston
U.S. Pat. No. 6,099,219 Bartholomay
U.S. Pat. No. 6,450,472 Cook, Jr.

However, neither of the prior art proposals disclose an assembly that 1) will reliably secure the ATV to the transport vehicle at high speed and over rough terrain, 2) can be quickly disassembled when not in use so that no component extends upwardly from the transport vehicle bed to interfere with other uses of the transport vehicle, 3) can be quickly assembled when transportation of the ATV is desired, 4) is mounted for easy reach near the rear of the transport vehicle bed, and 5) does not project beyond the frame of the vehicle.

SUMMARY OF THE INVENTION

The present invention is directed to an ATV anchoring assembly that meets all of these criteria. Generally, the present assembly is comprised of eyebolts releasably attachable to the mounting plates, a crossbar that is extendable through the eyebolts, a tie down arm that is slidably and pivotally attachable at its proximal end onto the crossbar and to an ATV hitch with a hitch connector at its distal end. Mounting plates may also be included to reinforce the area around mounting holes in the vehicle bed.

The eyebolts are generally of the same dimensions and include an eye of a given inner diameter and a shank extending downwardly from the eye. A peripheral shoulder may extend outwardly from the shank below the eye. The shank may be threaded or not depending on the manner is which the eyebolts are attached to the vehicle bed. If threaded, the shank will also include a nut threadable onto the shank.

The crossbar, which has a cylindrical cross-section and a length greater than the given distance between the eyebolts, is slidable within the eyes of the eyebolts. Latching pins or other stops are provided to prevent the crossbar from sliding out of one or both eyebolts during use. For example, the crossbar can include a peripheral protrusion at one end and a cotter pin or other removable connector at its opposite end outside the eyebolts. Alternatively, removable connectors can be used at both ends of the crossbar. The crossbar may be a solid bar or tubular, e.g., a pipe.

The tie down arm that extends from the crossbar to the ATV mounting attachment includes a proximal end that is rotatably and slidably attachable to the crossbar between the eyebolts, permitting ready adjustment of the side-to-side location of the tie down arm. For example, the proximal end of the tie down arm may include a circular eye sized for insertion over the crossbar so that the tie down arm is slidable on the crossbar. The distal end of the arm includes a hitch connector for releasably attaching the distal end of the arm to the ATV hitch.

The tie down arm is longitudinally adjustable so that the outer end of the arm can be aligned with the ATV hitch without moving the ATV. As shown in the preferred embodiment, the arm is comprised of inner and outer sleeves with longitudinal bores to receive a threaded rod joining the sleeves. That is, the inner sleeve has a proximal end with a transverse crossbar bore and a distal end with a longitudinal threaded bore to receive the proximal end of the threaded rod. The outer sleeve has a proximal end with a longitudinal threaded bore to receive the distal end of the threaded rod and a distal end carrying a hitch receiver to attach the arm to the ATV hitch. Other configurations for telescoping the arm will be apparent to one skilled in the art. For example, a turnbuckle arrangement with an inner sleeve and the attachment means mounted on the distal ends of threaded rods insertable into the ends of the sleeve can be used. Also, the outer sleeve can be eliminated with the hitch receiver being attached to the distal end of the rod.

The hitch receiver is configured to be compatible with the configuration of the ATV hitch. For example, the hitch may include a vertical plate with a transverse attachment bore, while the arm hitch receiver is a clevis that is sized to receive the plate and a clevis pin for insertion through the bore. Alternatively, the ATV hitch can include a horizontal plate with a vertical bore, while the hitch receiver is comprised of an upright threaded rod insertable through the vertical bore and a nut, pin or other releasable means to secure the rod in the bore.

The anchoring assembly may also include mounting plates that may be releasably or permanently attached to the transport vehicle bed at a given distance from each other along an axis transverse to the longitudinal axis of the vehicle bed, and thereby the ATV axle when the ATV is loaded into the vehicle bed. As used herein, "permanently" attached means that the mounting plates are not intended for removal upon disassembly of the anchoring assembly. For example, the mounting plates may be bolted to the vehicle bed. In another embodiment, the mounting plates may be in the form of washers that are inserted around the eyebolt shanks on top of the vehicle bed. Additional washers may be used beneath the bed, particularly when the eyebolts have threaded shanks. Each mounting plate includes a vertical bore adapted to receive the shank of an eyebolt so that the eye portion of the eyebolt protrudes above the mounting plate when inserted. The eyebolt may be rotatable within the bore.

In use, the eyebolts are inserted into bores in the vehicle bed that are spaced at a given distance transverse to the longitudinal axis of the vehicle bed, and preferably equidistant from the vehicle bed longitudinal centerline. If mounting plates are used, they may be preinstalled over the mounting bores. The crossbar is then inserted through one of the eyebolts. The inner end of the tie down arm is inserted over the crossbar and the crossbar is then inserted through the other eyebolt. A pin or other releasable attachment means is then attached to the outer end of the crossbar to secure the crossbar in the eyebolts. The crossbar is then rotatable within the eyebolts and the inner end of the tie down is slidable onto and rotatable about the crossbar.

The ATV is then rolled or driven onto the vehicle bed so that the ATV hitch is close to the anchoring assembly. Exact placement is not required so long as the hitch is positioned between the eyebolts and the distance from the crossbar to the hitch does not exceed the extended length of the tie down arm. The tie down arm is then slid along the crossbar until the arm is aligned with the hitch. The ATV can then be rolled backward or forward and/or the tie down arm can be shortened or lengthened until the receiver is aligned with the hitch. The receiver is then attached to the hitch. Due to the rigidity of the anchor assembly and the means of attachment, the ATV is securely held onto the transport vehicle bed. After use, the anchoring assembly is disassembled, leaving only the mounting plates or just the mounting holes in the bed, so that there is no interference with other uses of the vehicle.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
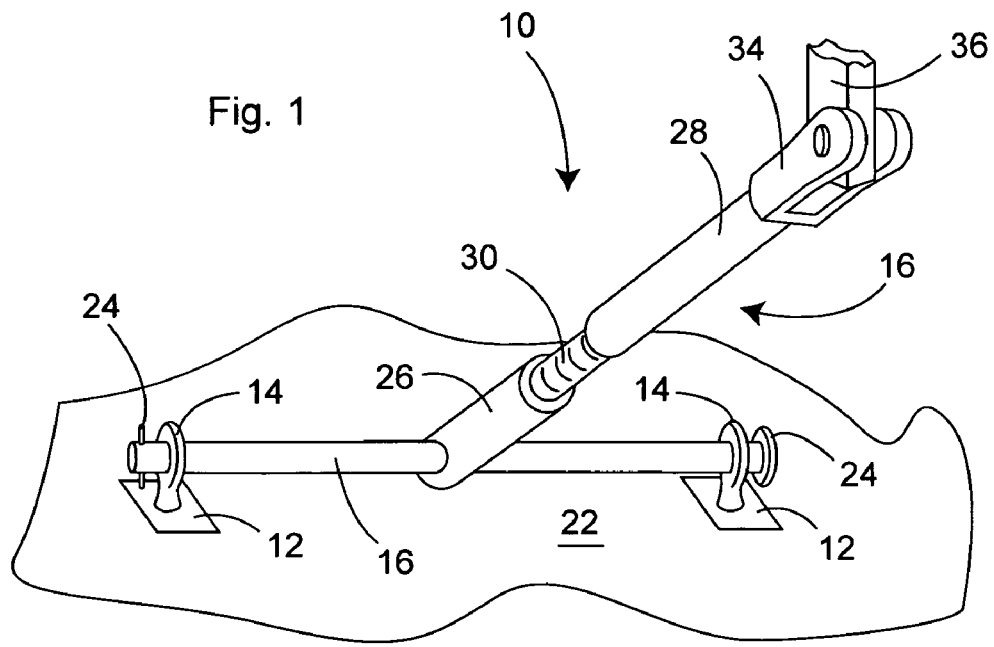
FIG. 1 is a perspective view of a first embodiment of the invention.
Figure 2:
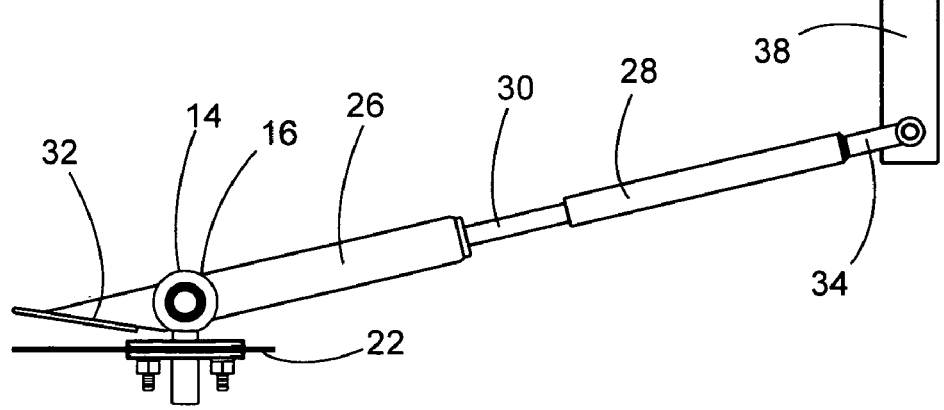
FIG. 2 is a side view of the first embodiment.

As best illustrated in FIGS. 1 and 2, a first embodiment of the ATV anchoring assembly, generally 10, is comprised of mounting plates 12, including bores to receive eyebolts 14, crossbar 16 extending through eyebolts 14, and tie down arm, generally 16 pivotally attached to crossbar 16.

Mounting plates 12 are attached, e.g., by bolts 20 to a bed 22 of a transport vehicle, e.g., a pickup truck. Crossbar 16 is pivotal within eyebolts 14 and is held in eyebolts 14 by stops 24, at least one of which is detachable for removal of crossbar 16. The length of crossbar 16 is transverse to the longitudinal axis of the vehicle bed and is less than the distance separating the wheels of the ATV so that the ATV can be driven over the assembly.

Tie down arm 16 is comprised of longitudinally aligned inner sleeve 26, outer sleeve 28 and connecting rod 30. Sleeve 26 has a proximal end pivotally attached to crossbar 16 and a distal end with a threaded longitudinal bore. Outer sleeve 28 has a proximal end with a threaded longitudinal bore and a distal end supporting a hitch connector to attach arm 16 to an ATV hitch. Rod 30 is threaded into the facing bores of sleeves 26 and 28. Preferably, one sleeve bore is a right hand thread and the other sleeve bore is a left hand thread so that rotation of the sleeves in opposite directions extends or shortens the length of arm 16. The distal end of sleeve 26 can include a stop plate 32 adapted to limit upward rotation of arm 16 by engagement with bed 22.

Figure 3:
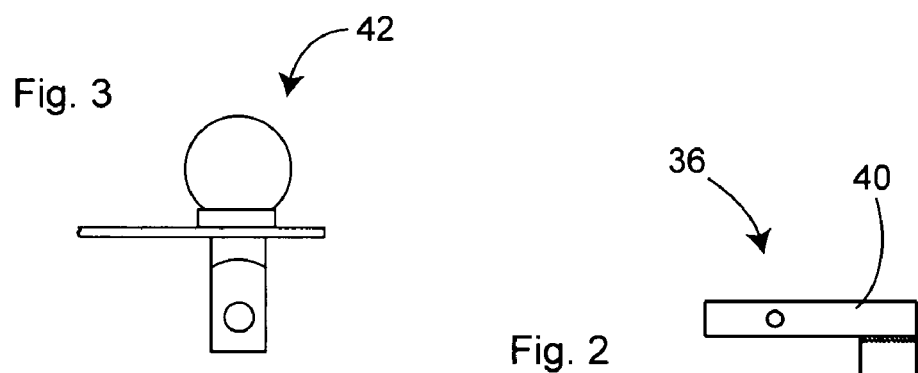
FIG. 3 is a side view of a ball adapter attachment bracket.

Various types of hitch connectors can be used in the present invention depending upon the manner in which arm 16 is releasably attached to the ATV. For example, hitch connector 34 shown in FIGS. 1 and 2 is a clevis that includes a clevis pin for insertion through a hole in the ATV hitch. A first type of ATV hitch can be, for example, hitch 36 adapted for insertion into the ATV hitch receiver, not shown. Hitch 36 is comprised of a vertical arm 38 with an opening to receive a clevis pin and a horizontal arm 40, normally having a rectangular cross-section of 1¼ inches or 2 inches for insertion into the ATV hitch receiver. Alternative hitch 42 shown in FIG. 3 can be in the form of a ball hitch adapter with a downwardly extending arm that includes a hole to receive the clevis pin.

Figure 4:
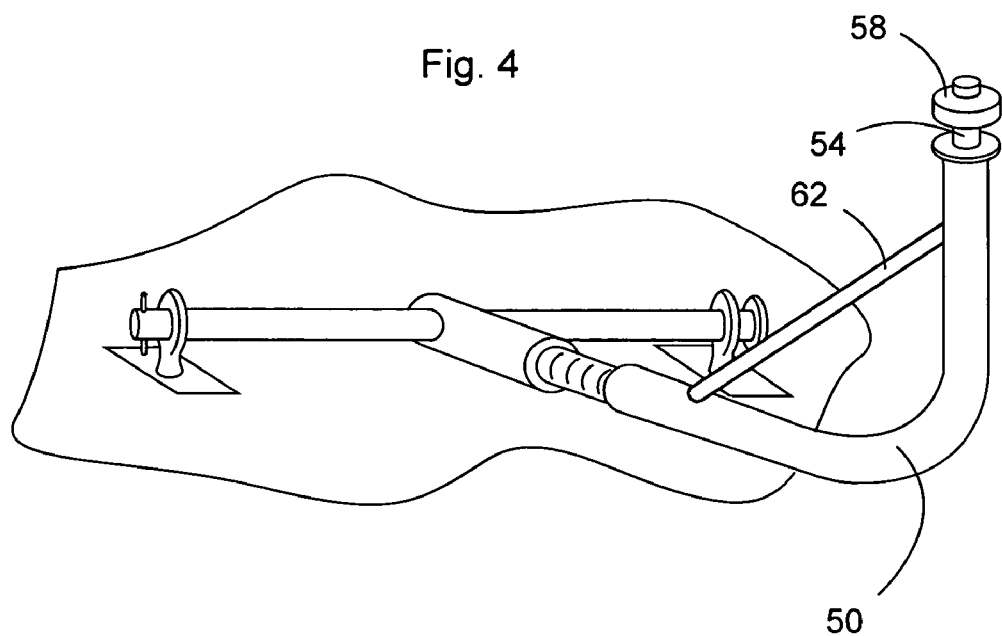
FIG. 4 is a perspective view of a second embodiment of the invention.
Figure 5:
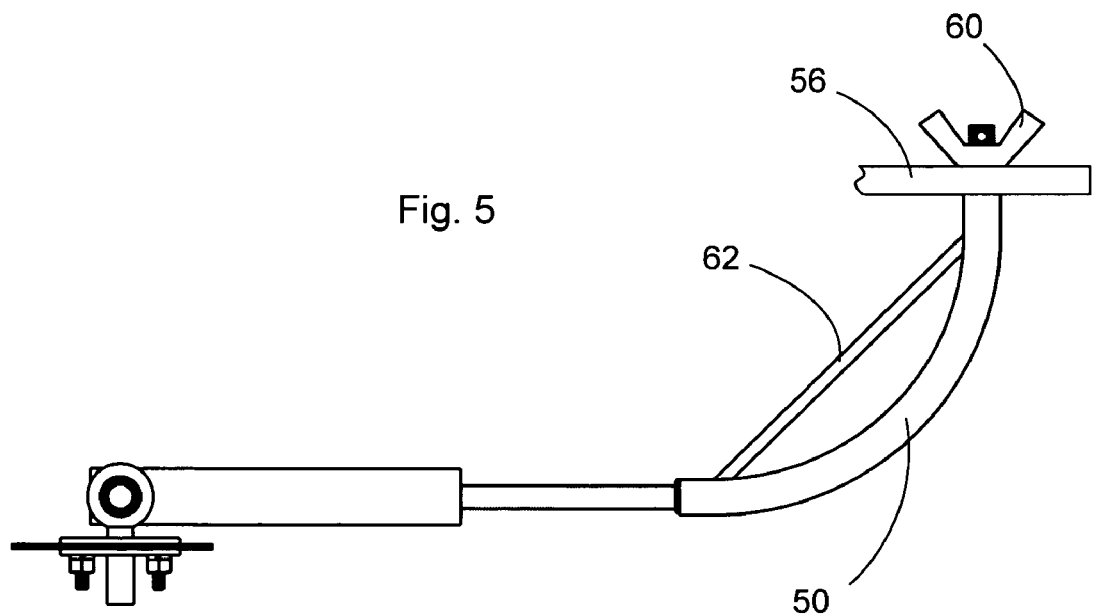
FIG. 5 is a side view of the second embodiment.

In the second alternative illustrated in FIGS. 4 and 5, all components of the anchoring assembly are the same as in the first embodiment illustrated in FIGS. 1 and 2, except for outer sleeve 50 which replaces outer sleeve 28 and hitch connector 52 replaces hitch connector 34. Sleeve 50 is upwardly curved 90° from a horizontal proximal end that includes a threaded bore for insertion of rod 30 to a vertical distal end that terminates in a hitch connector comprised of a bolt 54 sized for insertion through a hole in horizontal attachment plate 56. A nut 58 or wing nut 60 secures bolt 54 to plate 56. Brace 62 reinforces sleeve 50.

Figure 6:
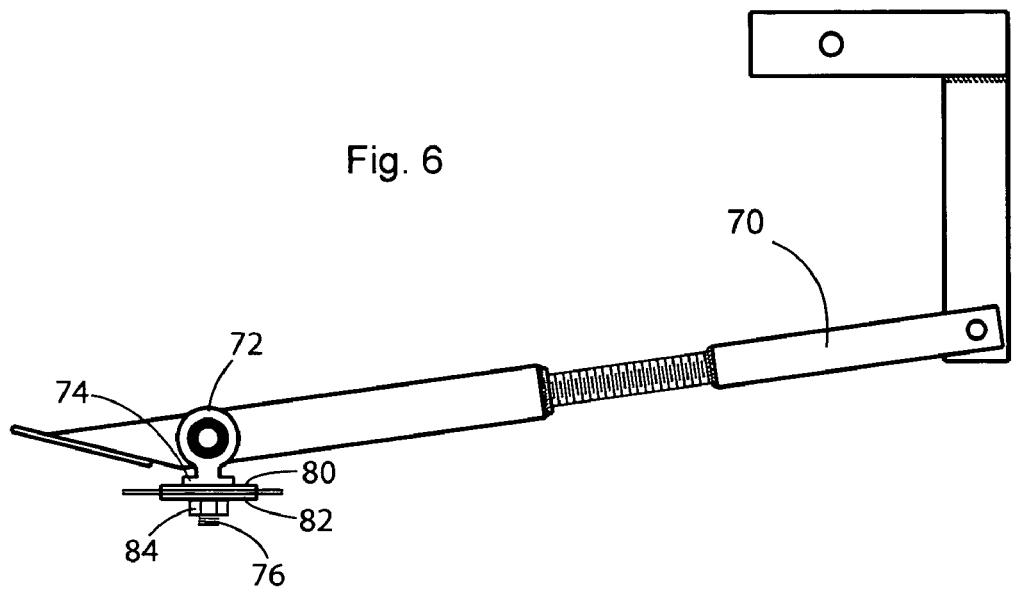
FIG. 6 is a side view of the third embodiment.
Figure 7:
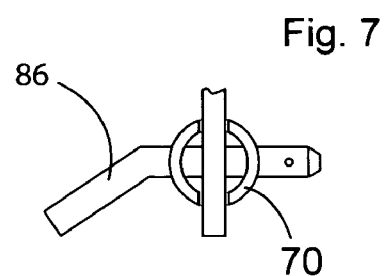
FIG. 7 is a front view of the front end of the third embodiment.

As best shown in FIGS. 6 and 7, a third embodiment of the invention is like the embodiment illustrated in FIGS. 1 and 2 except that outer sleeve 28 and hitch connector 34 are replaced by slotted tube or pipe 70 having a threaded inner end for connection to rod 30 and a vertically slotted outer end for insertion of vertical arm 38 of hitch 36. Eyebolt 72 includes shoulder 74 and threaded shank 76. Eyebolt 72 is secured to vehicle bed 78 with upper and lower washers 80 and 82, respectively, and nut 84. As shown in FIG. 7, hitch pin 86 extends through holes in pipe 70 and arm 38 to releasably lock pipe 70 to arm 38.

Figure 8:
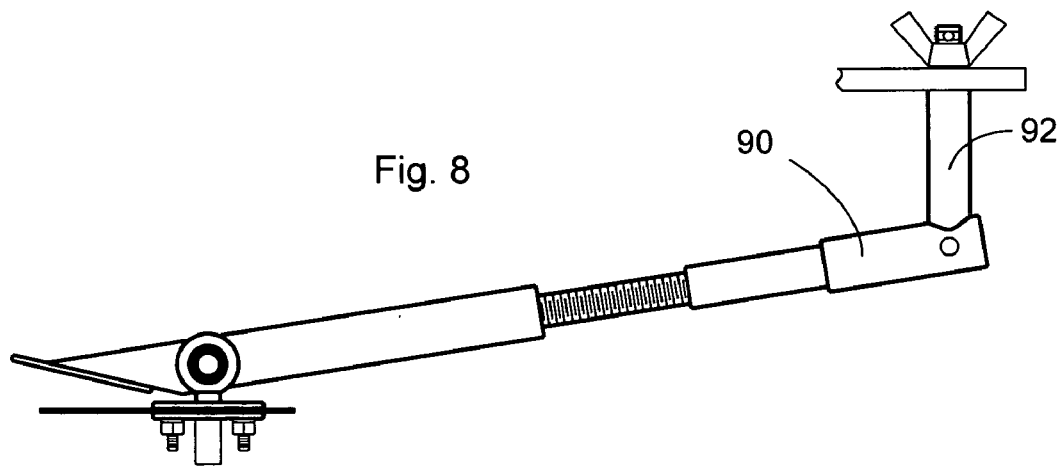
FIG. 8 is a side view of the fourth embodiment.

As best shown in FIG. 8, a fourth embodiment of the invention is like the second embodiment illustrated in FIGS. 4 and 5, except that outer sleeve 50 is replaced by outer sleeve 90, which includes a threaded inner end to receive rod 30 and a vertical attachment post 92 with a threaded upper end for insertion through a hole in attachment plate 56 as shown in FIG. 5. Post 92 is at an angle of about 80° relative to the longitudinal axis of sleeve 90.

Figure 9:
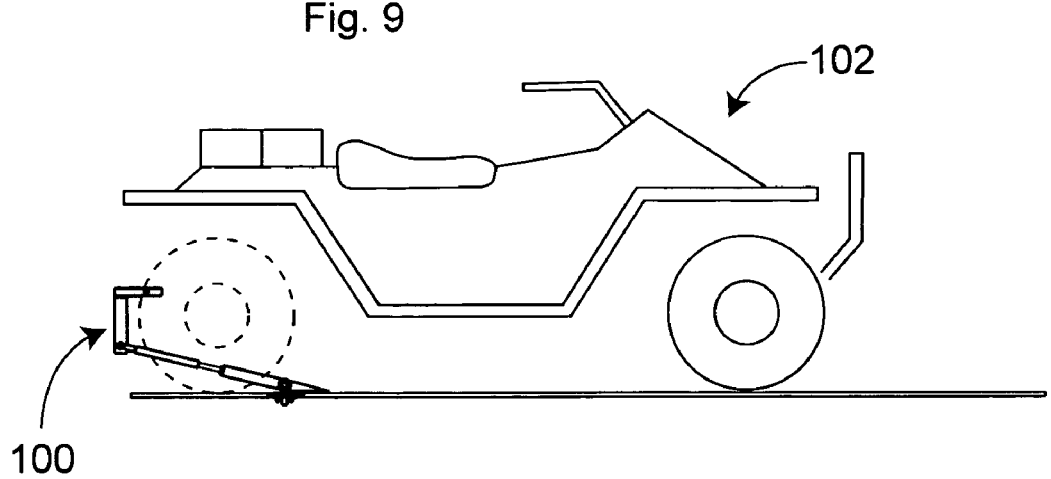
FIG. 9 is a side view of an ATV showing positioning of the assembly on a vehicle bed relative to the ATV.
Figure 10:
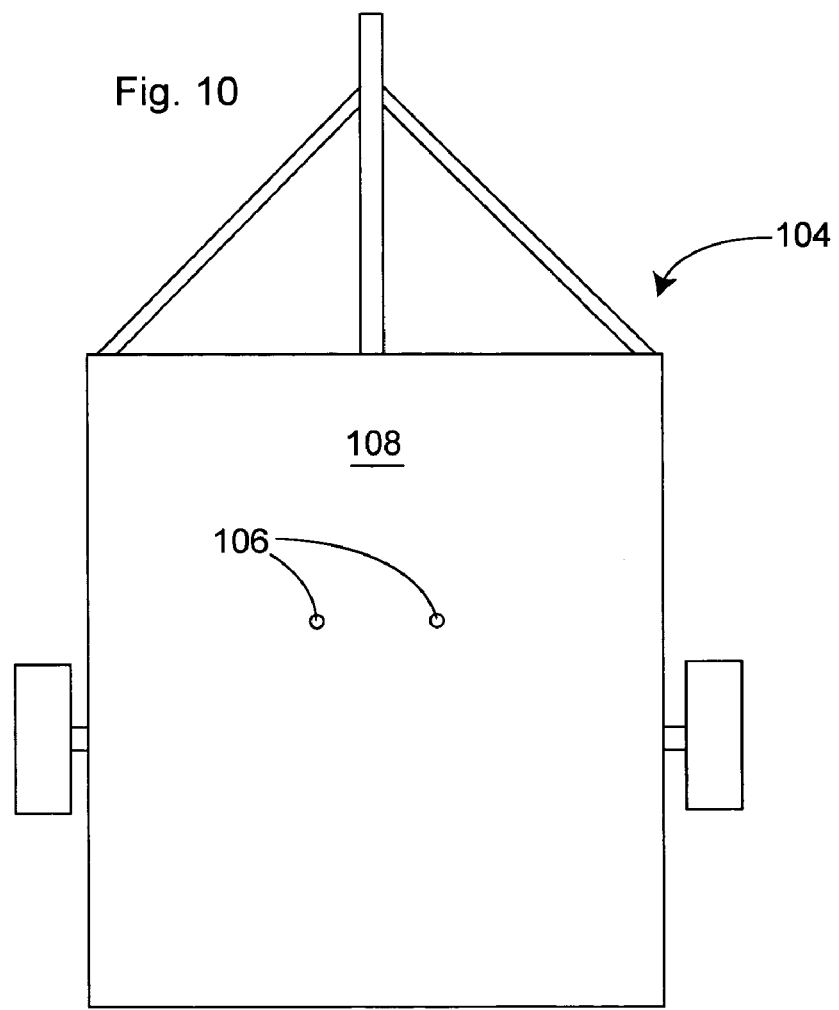
FIG. 10 is a top view of a trailer showing positioning of mounting holes in the trailer bed.

FIG. 9 illustrates the relationship of assembly 100 to ATV 102. FIG. 10 illustrates mounting holes 106 transversely spaced relative to the longitudinal axis of bed 108.

It will be understood that the invention also contemplates an anchoring assembly kit comprised of one of the inner sleeves, the threaded rod, and two or more outer sleeves, e.g., the outer sleeves illustrated in the third and fourth embodiments. With this kit, the assembly can be attached to hitches of different configurations.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An anchoring assembly to secure a transportable vehicle to a bed of a transport vehicle comprising:
    a) first and second eyebolts, each eyebolt having an eye and a shank;
    b) a crossbar insertable through the eyes of said eyebolts; and
    c) a tie down arm having a proximal end slidably attachable to said crossbar and a distal end including a connector releasibly attachable to said transportable vehicle.

2. The assembly of claim 1, further including first and second mounting plates including vertical bores sized to receive said eyebolt shanks.

3. The assembly of claim 1, wherein said crossbar has a cylindrical cross-section.

4. The assembly of claim 1, wherein said tie down arm proximal end includes an eye sized for insertion over said crossbar.

5. The assembly of claim 1, wherein said transportable vehicle includes a hitch and said arm connector is adapted for attachment to said hitch.

6. The assembly of claim 1, wherein said arm includes a stop plate preventing upward rotation of said arm beyond a predetermined angle.

7. The assembly of claim 1, wherein said arm is curved upwardly at its distal end.

8. The assembly of claim 1, wherein said arm is telescoping.

9. The assembly of claim 1, wherein said eyebolt shanks are threaded, said assembly further including nuts threadable onto said shanks.

10. The assembly of claim 1, wherein said crossbar has opposed ends and a releasable connector adjacent one of said opposed ends, said connector adjacent said one end having a length greater than a diameter of one of said eyebolts.

11. The assembly of claim 1, wherein said transportable vehicle is an ATV, a lawn mower, a golf cart, or a 6×6.

12. The assembly of claim 1, wherein said transport vehicle is a pickup truck or a wheeled trailer.

13. An anchoring assembly to secure a transportable vehicle having a hitch to a bed of a transport vehicle comprising:
    a) first and second eyebolts, each eyebolt having a circular eye and shank sized for insertion through said bed;
    b) a cylindrical crossbar with opposed ends insertable through the eyes of said eyebolts, said crossbar including a releasable latching pin adjacent at least one of its ends; and
    c) a tie down arm having a proximal end with an eye insertable over said crossbar and a distal end including a hitch connector releasably attachable to said transportable vehicle hitch.

14. The assembly of claim 13, further including first and second mounting plates including vertical bores sized to receive said eyebolt shanks.

15. The assembly of claim 13, wherein said arm includes a stop plate preventing upward rotation of said arm beyond a predetermined angle.

16. The assembly of claim 13, wherein said arm is telescoping.

17. The assembly of claim 13, wherein said eyebolt shanks are threaded, said assembly further including nuts threadable onto said shanks.

18. An anchoring assembly to secure a transportable vehicle having a hitch to a bed of a transport vehicle, said vehicle bed having a longitudinal centerline and including mounting holes spaced transverse to said centerline at a given distance from each other comprising:
    a) first and second eyebolts, each eyebolt having a circular eye and threaded shank sized for insertion downwardly through one of said mounting holes and a nut threadable on said shank beneath said bed;
    b) a cylindrical crossbar having a length greater than said given distance insertable through the eyes of said eyebolts, said crossbar including a releasable latching pin adjacent at least one end of said crossbar; and
    c) a telescoping tie down arm having a proximal end with an eye insertable over said crossbar between said eyebolts and a distal end including a hitch connector releasably attachable to said transportable vehicle hitch.

19. The assembly of claim 18, wherein said tie down arm includes inner and outer sleeves with longitudinal bores and a threaded rod adjustably insertable into said longitudinal bores.

20. The assembly of claim 18, further including first and second mounting plates including vertical bores sized to receive said eyebolt shanks.

* * * * *